United States Patent [19]
Maru et al.

[11] Patent Number: 5,432,483
[45] Date of Patent: Jul. 11, 1995

[54] DIGITAL QUADRATURE MODULATOR AND METHOD FOR TESTING THE SAME

[75] Inventors: Tsuguo Maru; Kazuyoshi Taguchi, both of Tokyo, Japan

[73] Assignee: NEC Corporation, Tokyo, Japan

[21] Appl. No.: 41,324

[22] Filed: Mar. 31, 1993

[30] Foreign Application Priority Data

May 29, 1992 [JP] Japan ................................. 4-138931

[51] Int. Cl.⁶ .................. G01R 31/3187; H04B 17/00
[52] U.S. Cl. ................................. 332/103; 371/20.1; 375/10.1
[58] Field of Search ...................... 332/103, 104, 105; 375/10, 39; 371/20.1, 20.4

[56] References Cited

U.S. PATENT DOCUMENTS 4,764,940 8/1988 Paneth et al. ....................... 332/104

FOREIGN PATENT DOCUMENTS

| | | |
|---|---|---|
| 0412490 | 2/1991 | European Pat. Off. |
| 3105254 | 9/1982 | Germany |
| 59-177799 | 10/1984 | Japan |
| 60-124100 | 7/1985 | Japan |

OTHER PUBLICATIONS

Suzuki et al., "Design of Quadrature Modulator for Digital FM Signaling with Digital Signal Processing," *Electronics and Communications in Japan,* vol. 65-B, No. 9, Sep. 1982, pp. 66-73.

*Patent Abstracts of Japan,* vol. 9, No. 37, p. 335, Feb. 16, 1985 (JP-A-59 177 799).

Orbit *Patent Abstracts of Japan,* vol. 9, No. 285, Nov. 12, 1985 (JP-A-60 124 100).

Suzuki et al., "Digital Implementation of Orthogonal Modulator for FM", Shingaku Review CS79-250, pp. 31-36, (date unknown).

*Primary Examiner*—Andrew M. Dolinar
*Attorney, Agent, or Firm*—Sughrue, Mion, Zinn, Macpeak & Seas

[57] ABSTRACT

An integrated circuit of a quadrature modulator comprising a baseband section implementing π/4 shift QPSK having a simple test circuit is disclosed. The baseband section comprises: an impulse response memory having memory cells each storing a cell data representing a value of impulse response sequence for a impulse response function; and an adder for convolution integral implementing convolution summer from the cell data. The quadrature modulator operates for testing the cell data of the memory cells of the impulse response memory when supplied with a test instruction signal. The test is carried out by reading out whole the memory cells of the impulse response memory and adding in the adder for convolution integral the cell data read out from whole the memory cells. The number of I/O terminals for carrying out the test for the impulse response memory and the chip size of the integrated circuit are reduced.

6 Claims, 3 Drawing Sheets

DIGITAL QUADRATURE MODULATOR AND METHOD FOR TESTING THE SAME

BACKGROUND OF THE INVENTION (a) Field of the Invention

The present invention relates to a digital quadrature modulator and a method for testing the same, and more particularly to an improvement for a test circuit and test method for the impulse response storage member of the digital quadrature modulator implementing $\pi/4$ shift quadrature phase-shift keying (QPSK).

(b) Description of the Related Art

A quadrature modulator has been used in which signal processing is carried out in a digital format to adapt the modulator for a digital vehicular communication. A quadrature modulator of this kind is described by Suzuki et al. in "Digital Implementation of Orthogonal Modulator for FM", "SHINGAKU REVIEW" CS79-250 pp 31–36.

Quadrature modulators described in the literature as mentioned above includes one in which $\pi/4$ shift QPSK is carried out for a narrow-band frequency modulation and for eliminating interference between successive symbols. The quadrature modulator implementing $\pi/4$ QPSK comprises: a baseband section in which complex envelope signals or baseband signals including an in-phase signal (I-signal) and an in-qudrature phase signal (Q-signal) are generated by processing input digital data through a low frequency processing; and a frequency conversion section in which RF output signal is generated by adding the outputs of two balanced modulators each modulating one of quadrature carriers by one of the baseband signals outputted from the low frequency section.

With the digital quadrature modulator as described above, there is an advantage in which setting an accurate roll-off factor and correction of the phase error in a mixer can be easily carried out, since the processing in the baseband section is carried out in a digital format. Such a processing is described by Tsuguo Maru in Japanese Patent Application No. Hei-3(1991)-321219. Additionally, it has an advantage in which the stability of frequency in the output modulated signal is as high as the stability of the output of a stabilized local oscillator.

In the baseband section of the digital quadrature modulator described above and implemented by an integrated circuit, an impulse response storage member or impulse response memory is used for storing impulse response sequence used during a convolution summer for implementing $\pi/4$ shift QPSK. When an integrated circuit implementing a baseband section of a quadrature modulator is fabricated, the contents stored in the impulse response memory of the baseband section must be tested during a functional test thereof. The content in each of the memory cells of the impulse response memory constituted by a read only memory is read out during the test sequence through I/O terminals of the integrated circuit to make sure that there is no defects such as a disconnection or a short circuit within the cell. Consequently, I/O terminals of bus lines for addressing the memory cells and for outputting the content of the impulse response memory are required in a number depending on the number of bits of the impulse response memory.

In order to reduce the chip size of an integrated circuit, the number of I/O terminals and protective buffers associated with the I/O terminals should be limited to a minimum. Therefore, it is desirable to reduce the number of I/O terminals as by employing a configuration in which the bus lines for testing the impulse response memory are connected to the bus lines for the internal registers of the baseband section. However, the bus lines for the internal registers are connected to the central processing unit (CPU) controlling the quadrature modulator from outside the chip, so that the complex envelope signals are subject to logic noises due to frequently changing signals on the bus lines connected to the internal register. Hence, a certain amount of spurious signals would be generated in the output of the baseband section during a normal operation due to the logic noises on the bus lines.

SUMMARY OF THE INVENTION

An object of the present invention is to provide a digital quadrature modulator and a method for testing the same in which the content of the impulse response memory can be tested without providing I/O terminals for addressing the memory cells of the impulse response memory or for outputting the content of each of the memory cells using only a small number of additional circuit elements.

Another object of the present invention is to provide a digital quadrature modulator and a method for manufacturing the same in which a spurious signal caused by the logic noise on the bus lines generated by frequently changing signals from CPU is avoided in the outputs of the baseband section and outputs of the balanced modulators.

According to a first aspect of the present invention, there is provided a digital quadrature modulator having a baseband section for outputting modulated signals in the form of an inphase and an in-qudrature phase signals by implementing convolution summer for processing an input digital data with an impulse response function and a frequency conversion section receiving the modulated signals. The baseband section comprises: an impulse response storage member having memory cells each storing a cell data representing a value of at least one impulse response sequence for the impulse response function at each of sliced times; access means for accessing the memory cells; adding means for receiving the cell data of the memory cells accessed by the access means in sequence and adding the cell data received in sequence; control means for controlling the access means and said adding means to generate at least one convolution integral in the adding means during a normal operation mode and for controlling the access means and the adding means to generate a sum data in the adding means during a test operation mode, the sum data representing a sum of the cell data of whole the memory cells; a comparator for comparing the sum data with a predetermined reference valuer; and input means for inputting a mode instruction signal for operating the control means either in the normal operation mode or in the test operation mode.

According to a second aspect of the present invention, there is provided a method for testing a digital quadrature modulator implementing convolution summer in an adder for convolution integral by adding cell data consecutively outputted from an impulse response storage member having memory cells, the memory cells each having a cell data representing a value of at least one impulse response sequence for an impulse response function at each of sliced times, the method including steps of: inputting a test instruction signal for shifting the qudrature modulator in a test mode; adding the cell data of whole the memory cells in the adder for generating a sum data in the test mode; and comparing the sum data with a predetermined value.

According to the qudrature modulator and the method for testing the same of the present invention, since the test for the impulse response memory is carried out through a less number of I/O terminals and buffers without logic noises caused by a CPU, the chip size of the integrated circuit can be reduced and inclusive of spurious signals in the output of the qudrature modulator is avoided.

BRIEF DESCRIPTION OF THE DRAWINGS

Other and further objects, features and advantages of the present invention will be more apparent from the following description, referring to the accompanying drawings in which.

DESCRIPTION OF THE PREFERRED EMBODIMENTS

Now, the present invention will be described in more detail with reference to the drawings.

Figure 1A:
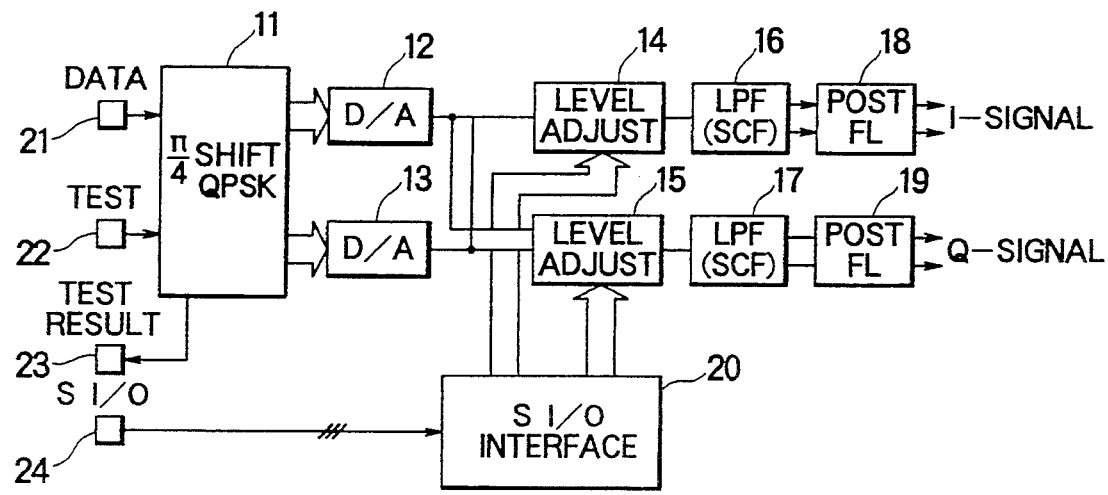
FIG. 1A is a block diagram of a baseband section of a quadrature modulator implemented by an integrated circuit according to an embodiment of the present invention.

FIG. 1A shows a baseband section of a quadrature modulator implemented by an integrated circuit according to an embodiment of the present invention. The baseband section generally designated at a reference numeral 10 comprises: a digital modulated signal generator 11 for implementing $\pi/4$ shift QPSK, digital-to-analog converters 12 and 13 each receiving one of the two outputs of the digital modulated signal generator 11; level adjusting circuits 14 and 15 for adjusting the levels of the outputs of the digital-to-analog converters 12 and 13 and for compensating a phase error existing in carriers by adding both the outputs of the digital-to-analog converters 12 and 13 multiplied by a certain factor, respectively; low-pass-filters (LPF) 16 and 17 and post-filters 18 and 19 each for suppressing spurious signals; and a serial I/O interface 20 for controlling the level adjusting circuits 14 and 15 based on the output of the quadrature modulator.

Figure 1B:
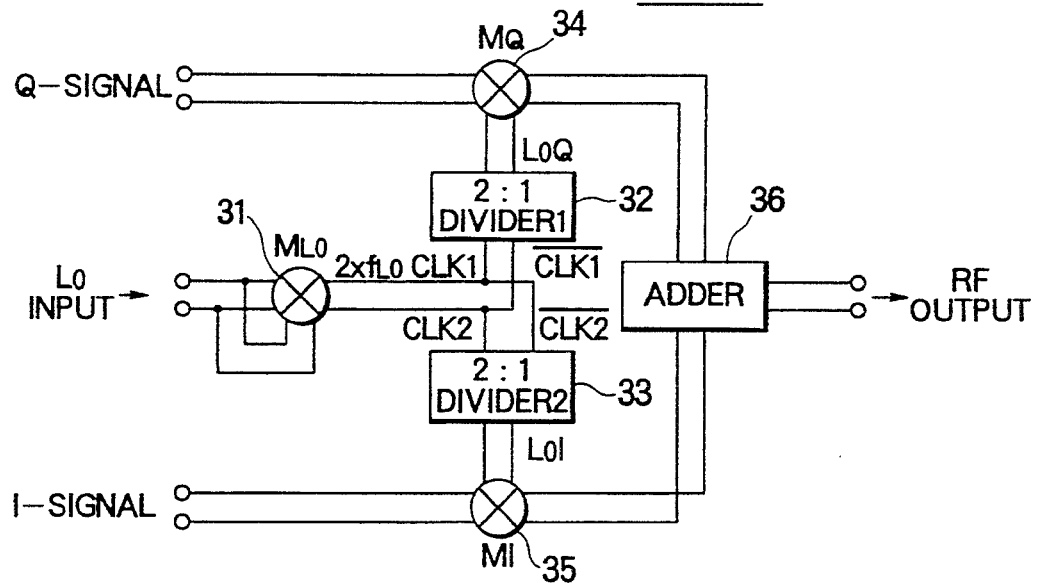
FIG. 1B is a block diagram of a frequency conversion section constituting the quadrature modulator according to the embodiment of the present invention together with the baseband section of FIG. 1A.

FIG. 1B shows a frequency conversion section generally designated at a reference numeral 30 constituting the quadrature modulator according to the embodiment of the present invention together with the baseband section 10 of FIG. 1A. The frequency conversion section 30 is of a conventional type and comprises: a frequency multiplier 31 receiving an outputs of a local oscillator not shown in the drawing; frequency dividers 32 and 33 each dividing the frequency of the outputs of the frequency multiplier 31 by a 2:1 ratio for generating two carriers in a quadrature representation; balanced modulators 34 and 35 each modulating one of the carriers by the respective baseband signals, i.e. I-signal and Q-signal, outputted from the baseband section 10; and an adder 36 for adding the outputs of the balanced modulator 34 and 35 and for generating a radio frequency (RF) output of the quadrature modulator of FIGS. 1A and 1B.

Back to FIG. 1A, the digital modulated signal generator 11 is supplied through an input terminal 21 with digital signal data to be transmitted and a test instruction signal supplied through a test terminal 22 and set at logic level 1 during a functional test after the fabrication of the integrated circuit. The test result is outputted through a single output terminal 23.

Figure 2:
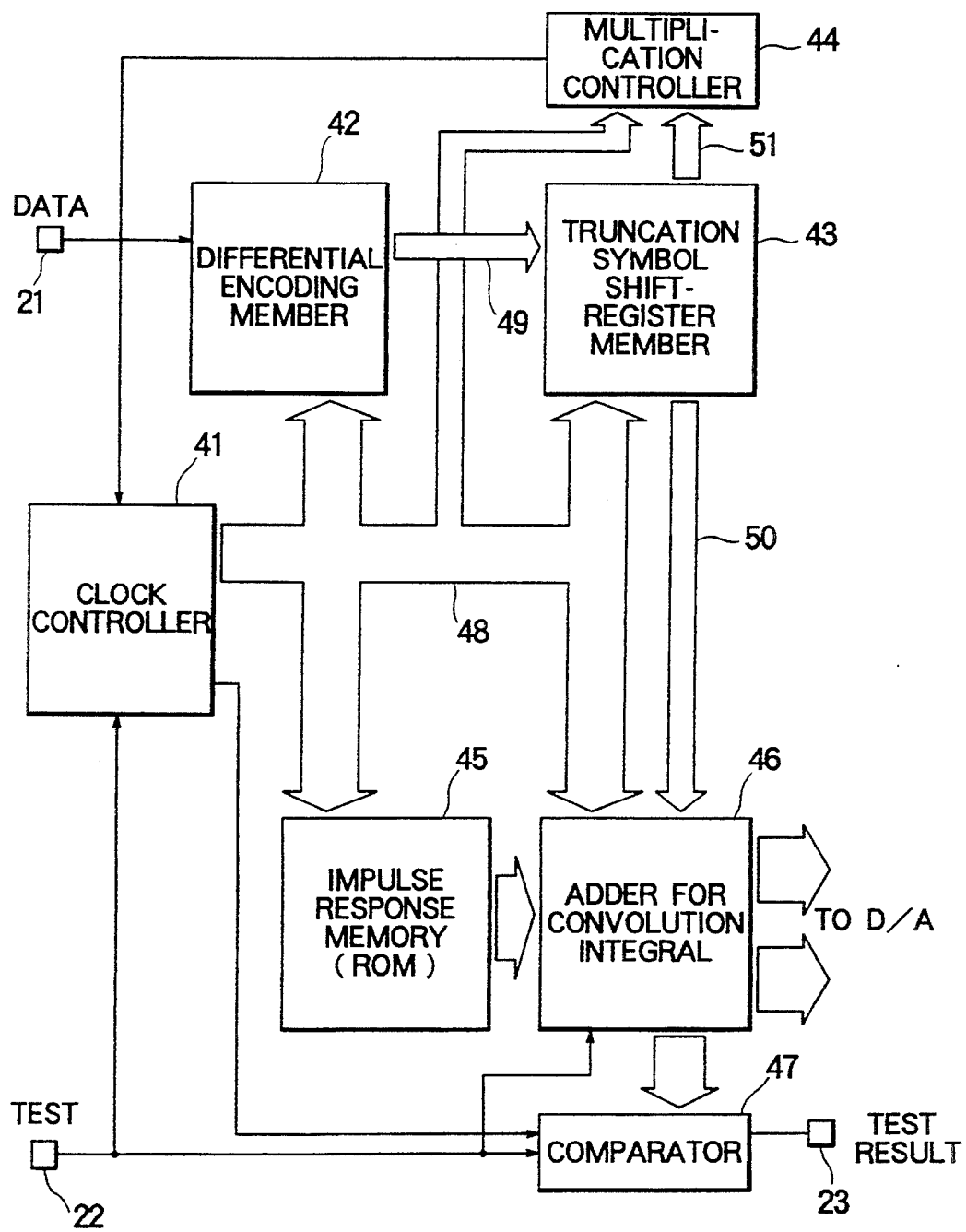
FIG. 2 is a block diagram of a $\pi/4$ shift QPSK of the baseband section shown in FIG. 1A.

FIG. 2 shows an example of the detailed configuration of the digital modulated signal generator 11 in FIG. 1A. As shown in FIG. 2, the modulated signal generator 11 is provided with a clock controller 41, differential encoding member 42, a truncation symbol shift-register member 43, a multiplication controller 44, an impulse response memory 45, an adder 46 for convolution integral, a comparator 47, independent bus lines 48 including address and data bus lines for transmitting signals within the digital modulated signal generator 11, and other signal lines 49, 50, 51.

The clock controller 41 supplies a timing clock signal through control signal lines not shown in the drawing based on the baud or symbol rate of the input digital data, the number of truncation symbols and the number of interpolations adopted for approximating an impulse response function. The clock controller 41 especially supplies the impulse response memory 45 with address signals of the impulse response memory 45 through the bus lines 48. The lower order bits of the address signal are periodically changed corresponding to each of the sliced times for the impulse response sequence. The signal for the high order bit of the address signal is supplied from the multiplication controller 44 through the clock controller 41.

The impulse response memory 45 as a whole stores two impulse response sequences used for convolution summer. The two impulse response sequences are different from each other in their amplitude, one in unit amplitude and the other in $1/\sqrt{2}$ of the unit amplitude. Each of the impulse response sequences is truncated based on a truncation symbol number, for example 8, and multiplied by a window function for correcting the error caused by the truncation of the impulse response function. Each of the memory cells of the impulse response memory 45 has a cell data corresponding to the value of the impulse response sequences at each of sliced times, which is designated by the clock controller and corresponds to the lower order bits of the address signal for the memory cell.

The differential encoding member 42 is supplied through the input terminal 21 with input data to be transmitted and outputts the phase information through signal lines 49 to the truncation symbol shift-register member 43. The differential encoding member 42 comprises a differential encoder for processing input data and means for mapping phase information on a I-Q phase plane from the output of the differential encoder.

The truncation symbol shift-register member 44 comprises a shift-register and some logic gates associated with the shift-register. The shift-register holds the phase information during the time interval corresponding to the number of the truncation symbol. The logic gates output the data representing the phase information based on the output of the shift register. The outputs of the logic gates are supplied through the signal lines 51 to the multiplication controller 44, which in turn supplies the high order bit of the address signal for the impulse response memory 45 to the clock controller 41 through the bus line 48.

The phase included in the phase information assumes 8 positions apart from each other by $\pi/4$ radian on I-Q co-ordinates plane. Hence, the I- and Q-co-ordinates each assumes values 1, $1/\sqrt{2}$, o, $-1/\sqrt{2}$, or $-1$ for each of the phase positions. The high order bit of the address signal for the impulse response memory 45 corresponds either 1 or $1/\sqrt{2}$ of the I- or Q-co-ordinates for designating one of the two impulse response sequences stored in the impulse response memory as described above. Hence, each of the memory cells of the impulse response memory 45 is addressed by the outputs of the clock controller outputting the high order bit corresponding to the waveform and lower order bits corresponding to the sliced times of the impulse response sequence.

The adder 46 for convolution integral is consecutively supplied with the cell data read out in sequence from the impulse response memory 45 and also with a control signal from the truncation symbol shift-register member 43 and the multiplication controller 44. The multiplication controller 44 outputts the control signal depending on the signal of the truncation symbol shift-register member 43, thereby controlling the operation of the adder 46 for the convolution integral. The adder 46 operates in such a way that, when the I- or Q- co-ordinates of the phase information is either 1 or $1/\sqrt{2}$, the adder functions for adding the new coming output inputted from the impulse response memory 45 to the value which remains in the adder 46 as the last result of the addition, for generating a usual convolution integral, whereas the adder 46 subtracts the new coming output from the last result when the I- or Q- co-ordinates is $-1$ or $-1/\sqrt{2}$. Hence, the convolution summer is carried out by the adder 46 together with the impulse response memory 45 which does not includes data for a negative impulse response sequence for the impulse response function.

The adder 46 for the convolution integral is controlled by the clock controller 41 during a normal operation mode to output the results of the convolution integral, i.e. an I-signal and a Q-signal of a digital modulated signal, to the digital-to-analog converter 12 and 13 of FIG. 1A. The digital I- and Q-signals are then converted to analog data and passed through the LPFs 16 and 17 and postfilters 18 and 19 to the frequency conversion section 30.

The comparator 47 is included in the digital modulated signal generator 11 for testing the impulse response memory 45 after the fabrication. The comparator 47 holds a data representing the sum of the contents of whole the memory cells of the impulse response memory 45 as its reference value, and is controlled by the clock controller 41 during a test mode operation so as to receive its input data from the adder 46 for convolution integral at the time of the end of the test sequence. The output line of the comparator 47 is connected to the test result terminal 23.

During a test mode, the test terminal 22 is set at 1, so that the clock controller 41, the adder 46 for convolution integral and the comparator 47 are shifted into a test mode operation. The adder 46 for convolution integral is initialized at the beginning of the test mode operation and consecutively adds the cell data inputted from the impulse response memory 45. The clock controller 41 supplies the impulse response memory 45 with address signal, including high order bit and lower order bits of the address, from address 0 to the final address of the impulse response memory 45.

After the clock controller 41 supplies the final address signal to the impulse response memory 45, the comparator 47 counting the clock pulses recognizes the end of the access of the memory cells and compares the output of the adder 46 for convolution integral with the reference value representing the sum of the predetermined cell data for all the cells of the impulse response memory 45. If the impulse response memory 45 has no defect in its cells or bus lines, the output of the adder 46 for the convolution integral must be the same as the reference value. The test result is outputted from the test result terminal 23, so that the content of all the cells of the impulse response memory can be verified.

The possibility of the presence of more than two defects in the impulse response memory 45 compensating each other to result in the same value as that in the case of no defect is, if possible, extremely small. Hence, when the sum of the contents of all the memory cells is equal to the reference value, it can be said that all of the memory cells have no defect therein.

Figure 3:
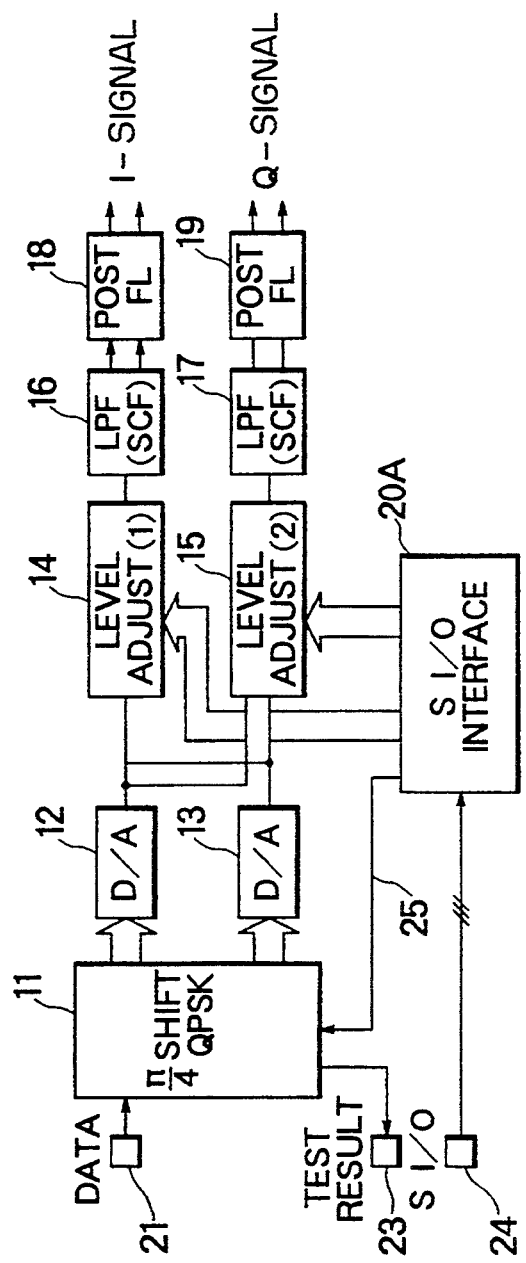
FIG. 3 is a block diagram of a baseband section implemented by an integrated circuit according to another embodiment of the present invention.

FIG. 3 shows another baseband section of an integrated circuit implementing a quadrature modulator according to a second embodiment of the present invention. In this embodiment, the test instruction signal is inputted to a serial I/O interface 20A supplying the level adjusting circuits 14 and 15 with the level signal. The serial I/O interface 20A supplies the modulated signal generator 11 through a test line 25 with the test instruction signal inputted through the serial I/O terminal 24 as a part of the serial data. The test result signal is outputted directly through the test result terminal 23. In this embodiment, a test terminal is not necessary for inputting a test instruction signal for testing the contents of the impulse response memory.

According to the embodiments of the present invention, impulse response memory can be tested without providing the I/O terminals for inputting the address signal or for outputting the contents of the memory cells of the impulse response memory, so that chip size of the integrated circuit implementing a quadrature modulator can be reduced due to the less number of I/O terminals and protective buffers associated with the I/O terminals for protecting the internal circuit elements.

Additionally, the adder operating for the convolution summer during a normal operation mode is used as a testing member for the impulse response memory during the test mode, so that additional internal circuit elements required for testing the impulse response memory is substantially only the comparator. Hence, a quadrature modulator of a simple construction can be obtained.

Since above embodiments are described only for examples, the present invention is not limited to such embodiments and it will be obvious for those skilled in the art that various modifications or alterations can be easily made based on the above embodiments under the scope of the present invention.

What is claimed is:

1. A digital quadrature modulator having a baseband section for outputting modulated signals in the form of an inphase and an in-qudrature phase signals by implementing convolution summer for processing input digital data with an impulse response function and a frequency conversion section receiving the modulated signals, said baseband section comprising:

an impulse response storage member having memory cells each storing a cell data representing a value of at least one impulse response sequence for the impulse response function at each of sliced times;

access means for accessing said memory cells;

adding means for receiving the cell data of said memory cells accessed by said access means in sequence and adding the cell data received in sequence:

control means for controlling said access means and said adding means to generate at least one convolution integral in said adding means during a normal operation mode and for controlling said access means and said adding means to generate a sum data in said adding means during a test operation mode, the sum data representing a sum of said cell data of said memory cells;

a comparator for comparing the sum data with a predetermined reference value; and input means for inputting a mode instruction signal for operating said control means either in the normal operation mode or in the test operation mode.

2. A digital quadrature modulator as defined in claim 1 wherein said input means is a test terminal.

3. A digital quadrature modulator as defined in claim 1 wherein said input means is a serial I/O interface.

4. A digital quadrature modulator as defined in claim 1 wherein said baseband section implements $\pi/4$ shift quadrature phase-shift keying.

5. A digital quadrature modulator as defined in claim 1 wherein said impulse response storage member holds data representing two impulse response sequences.

6. A method for testing a digital quadrature modulator implementing convolution summer in an adder for convolution integral by adding cell data consecutively outputted from an impulse response storage member having memory cells, said memory cells each having a cell data representing a value of at least one impulse response sequence for an impulse response function at each of sliced times, said method including steps of: shifting said quadrature modulator into a test mode by applying a test instruction signal onto a test terminal; providing a clock controller to generate consecutive addresses of said memory cells; initializing said adder and applying said cell data consecutively outputted from said impulse response storage member; adding said cell data in said adder and generating a sum data in the test mode; comparing the sum data with a predetermined reference value; and rejecting said quadrature modulator when said sum data does not correspond with said predetermined reference value.

* * * * *

UNITED STATES PATENT AND TRADEMARK OFFICE
CERTIFICATE OF CORRECTION

PATENT NO.   : 5,432,483
DATED        : July 11, 1995
INVENTOR(S)  : Tsuguo MARU et al.

It is certified that error(s) appears in the above-identified patent and that said Letters Patent is hereby corrected as shown below:

Col. 1, line 28, delete "qudrature" and insert --quadrature--.

Col. 2, line 35, delete "qudrature" and insert --quadrature--.

Col. 2, line 55, delete "valuer" and insert --value--.

Col. 3, line 2, delete "qudrature" and insert --quadrature--.

Col. 3, line 6, delete "qudrature" and insert --quadrature--.

Col. 3, line 12, delete "qudrature" and insert --quadrature--.

Col. 4, line 55, delete "outputts" and insert --outputs--.

Col. 5, line 25, delete "outputts" and insert --outputs--.

UNITED STATES PATENT AND TRADEMARK OFFICE
CERTIFICATE OF CORRECTION

PATENT NO. : 5,432,483
DATED : July 11, 1995
INVENTOR(S) : Tsuguo Maru et al.

It is certified that error appears in the above-indentified patent and that said Letters Patent is hereby corrected as shown below:

Column 6, line 66, delete "qudrature" and insert --quadrature--.

Signed and Sealed this

Twenty-seventh Day of February, 1996

Attest:

BRUCE LEHMAN

Attesting Officer      Commissioner of Patents and Trademarks